Figures 2, 3:
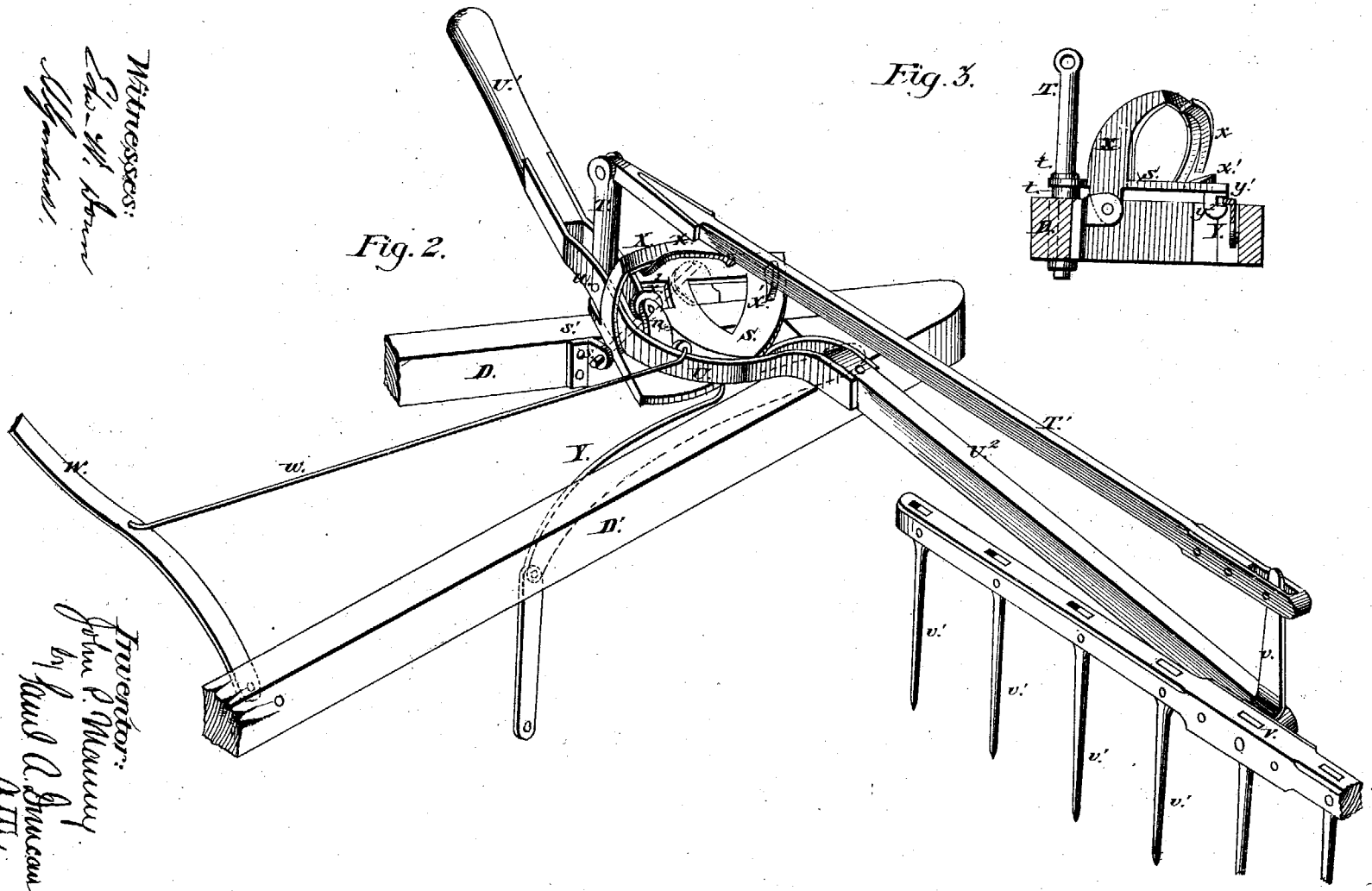

5 Sheets—Sheet 1.
J. P. MANNY.
HARVESTER.
No. 6,879. Reissued Jan. 25, 1876.
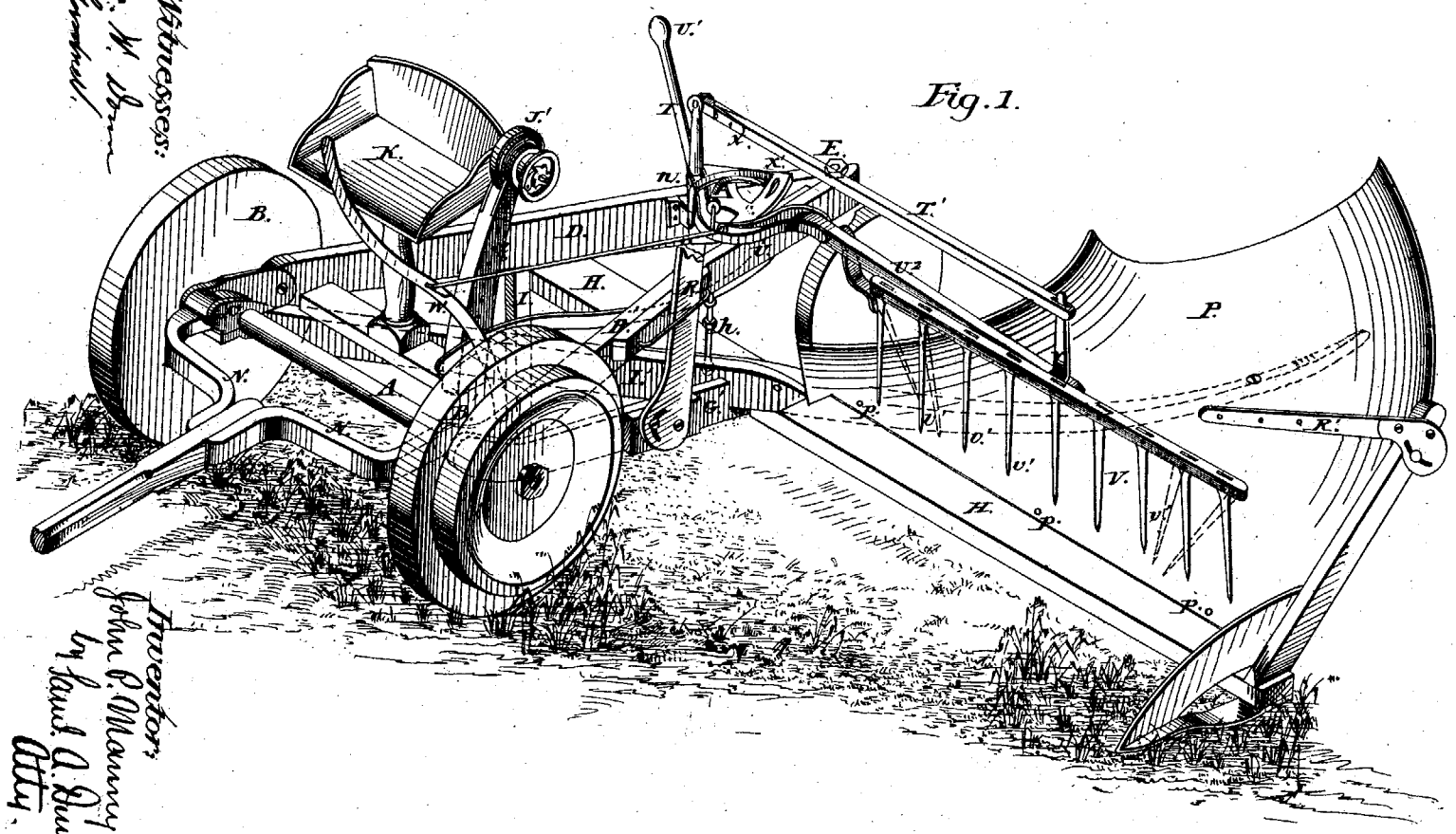
Witnesses:
Edw. W. Dorn
A. Goodnel.
Inventor:
John P. Manny
by Saml. A. Duncan
Atty.
N. PETERS, PHOTO-LITHOGRAPHER, WASHINGTON, D. C.

5 Sheets—Sheet 2.

J. P. MANNY.

HARVESTER.

No. 6,879.

Reissued Jan. 25, 1876.

Witnesses:
Edw. W. Down
A. Gardner.

Inventor:
John P. Manny
by Saml. A. Duncan
Atty.

N. PETERS, PHOTO-LITHOGRAPHER, WASHINGTON, D. C.

J. P. MANNY.
HARVESTER.
No. 6,879. Reissued Jan. 25, 1876.
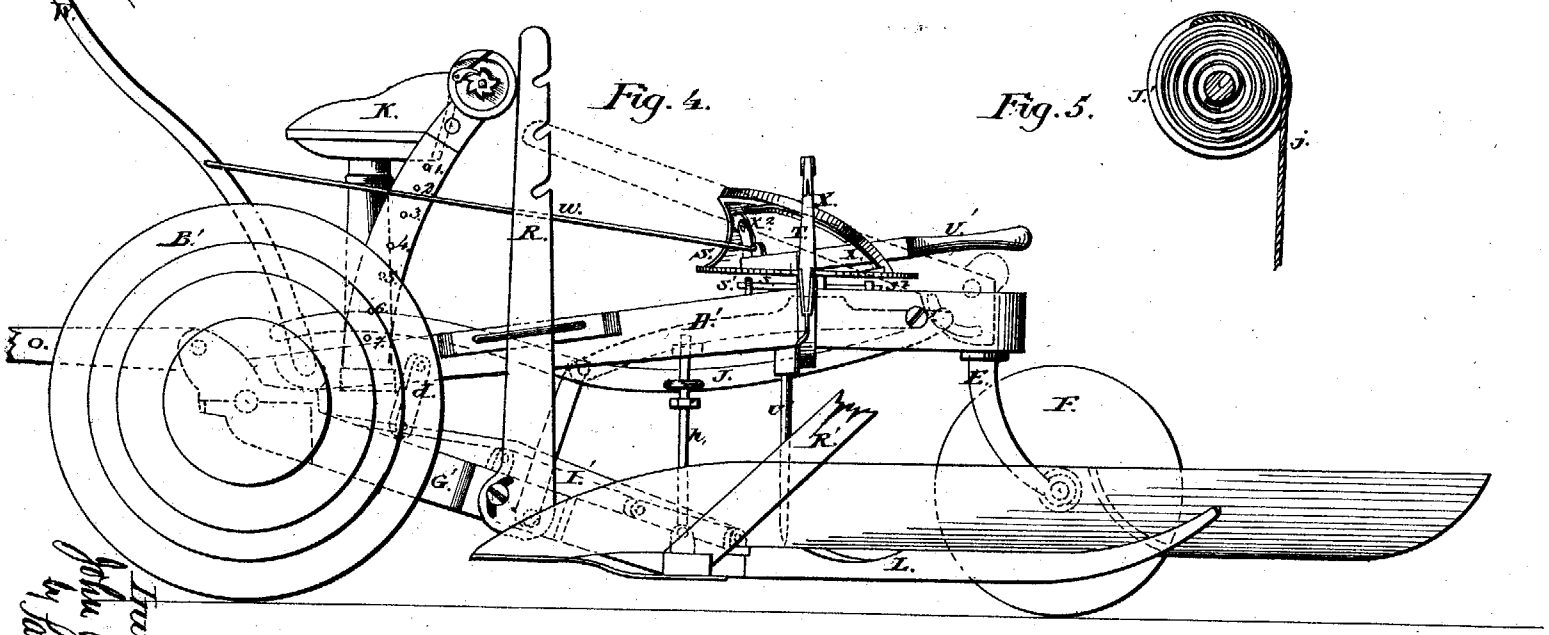
Witnesses:
Edw. W. Donn
M. Gardner
Inventor:
John P. Manny
by Saml. A. Duncan
Atty.
N. PETERS, PHOTO-LITHOGRAPHER, WASHINGTON, D. C.

5 Sheets—Sheet 4.
J. P. MANNY.
HARVESTER.
No. 6,879.
Reissued Jan. 25, 1876.
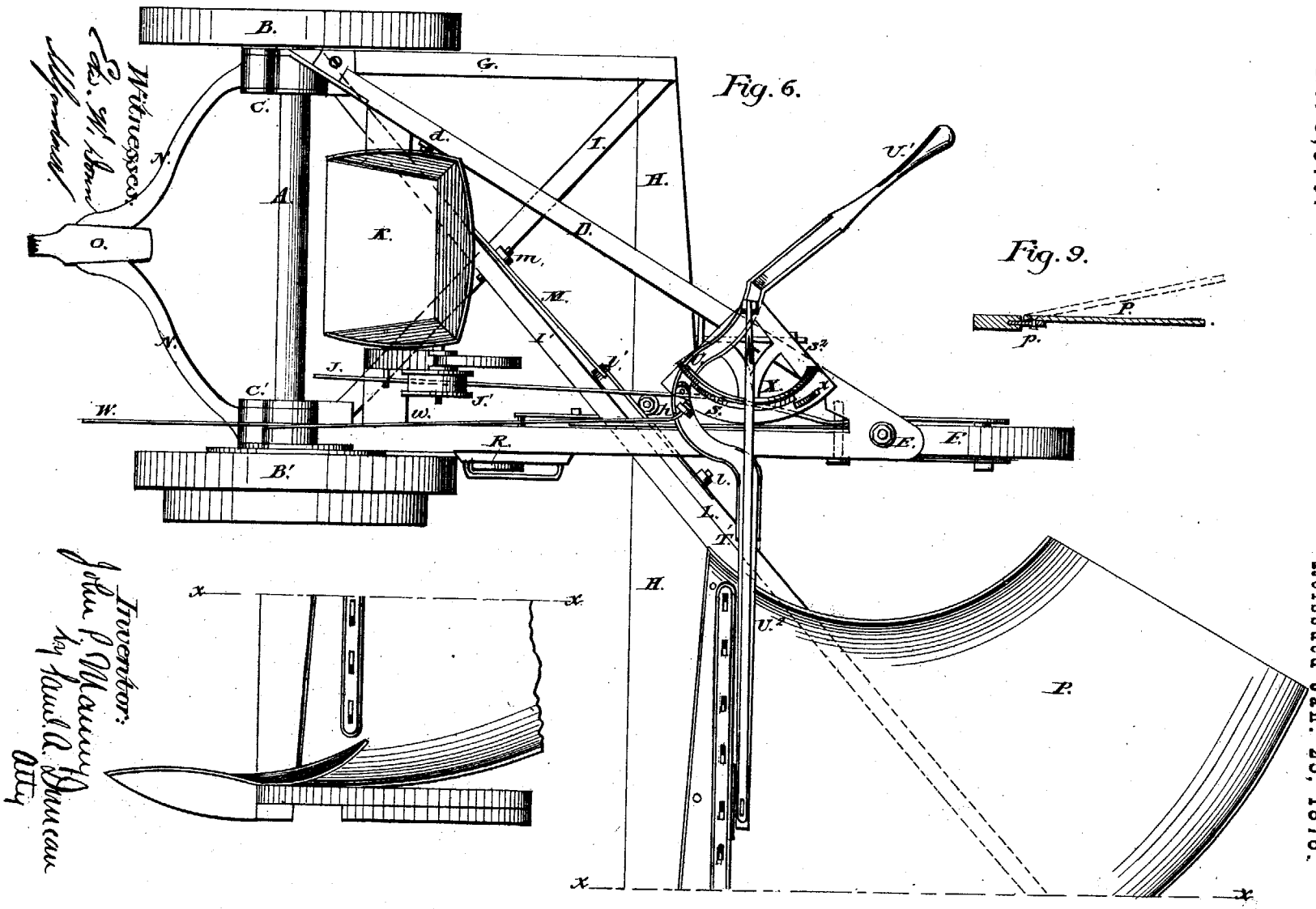
N. PETERS, PHOTO-LITHOGRAPHER, WASHINGTON, D. C.

J. P. MANNY.

HARVESTER.

No. 6,879.

Reissued Jan. 25, 1876.

Witnesses:

Edw. W. Down

M Gardner.

Inventor:

John P. Manny by Saml. A. Duncan

Atty

N. PETERS, PHOTO-LITHOGRAPHER, WASHINGTON, D. C.

UNITED STATES PATENT OFFICE.

JOHN P. MANNY, OF ROCKFORD, ILLINOIS.

IMPROVEMENT IN HARVESTERS.

Specification forming part of Letters Patent No. 17,798, dated July 14, 1857; reissue No. 3,580, dated August 3, 1869; reissue No. 6,879, dated January 25, 1876; application filed January 12, 1876.

DIVISION A.

*To all whom it may concern:*

Be it known that I, JOHN P. MANNY, of Rockford, in the county of Winnebago and State of Illinois, have invented certain new and useful Improvements in Harvesters, of which the following is a full, clear, and exact description:

The invention, as herein claimed, relates to the harvesting-machine when used as a reaper, and to that particular class of machines in which the cutting apparatus projects laterally from the path of the team, and in which the grain is removed from the platform, which is located immediately behind the finger-beam, by means of a rake sweeping over the platform in such manner as to cast the gavels upon the stubble out of the path of the team upon its next round.

The invention consists, first, in so constructing and arranging the sweep-rake and the platform, located as aforesaid, that the gavel will be condensed or compacted prior to its discharge upon the stubble.

The invention consists, further, in combining with a platform contracted in width from the front rearward, for the purpose above indicated, a rake, so constructed as to be adjustable laterally, according to the varying widths of the platform.

The invention further consists in the use, in connection with a rake moving over the platform of a rear-cut harvester, of a brace, extending under the grain-platform, by means of which the platform is prevented from drooping or sagging, and thus is at all times kept in proper position for the action of the rake in removing the gavel.

The invention further consists in the use, in a harvester provided with a raking mechanism, of a grain-platform, so attached to the finger-beam that its rear may be vertically adjusted relatively to the finger-beam, in order to preserve the harmonious relation between the platform and the rake.

In order that my invention as herein claimed may be fully understood, I have represented in the accompanying drawings, and will proceed to describe the principal parts of a machine in which I have embodied it, the parts omitted from the drawings being such as are well understood by builders of harvesters, and the parts shown in the drawings, but not described in the specification, being either parts well known in the art, or parts that form the subject-matter of other divisions by reissue of the Patent No. 17,798, granted me July 14, 1857.

Figure 8:
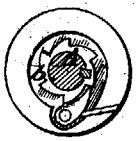
Figure 7:
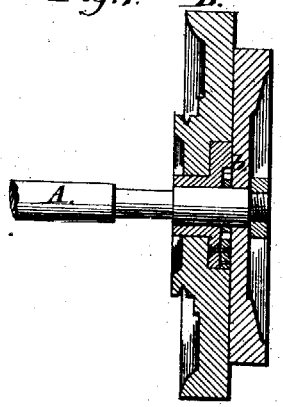
Figure 10:
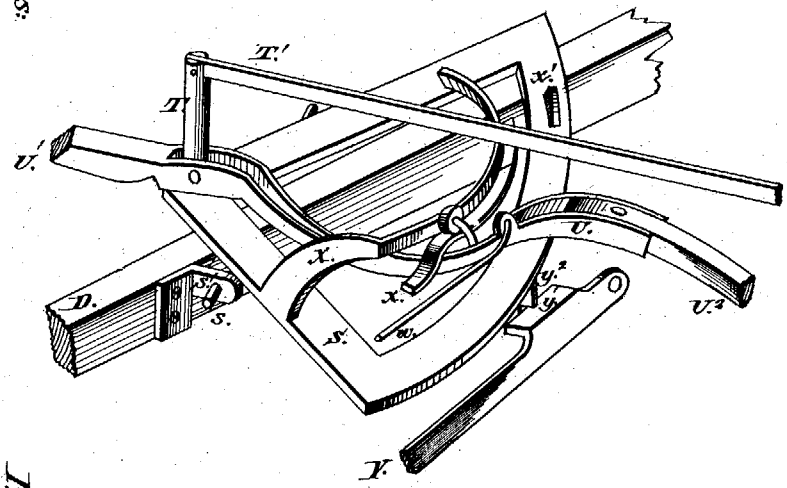

Figure 1 is a perspective view of the machine as seen from the divider side. Fig. 2 is a similar view, on an enlarged scale, of the raking mechanism. Fig. 3 is a view, in elevation, of the rake-supporting devices detached, and seen from the front. Fig. 4 is a view, in elevation, of the machine as seen from the divider side. Fig. 5 is a vertical section through the lifting-drum. Fig. 6 is a plan or top view of the machine. Fig. 7 is a vertical transverse section through the inner driving-wheel. Fig. 8 represents one of the backing-ratchets. Fig. 9 is a vertical section through the platform on the line *x x* of Fig. 6. Fig. 10 is an enlarged perspective view of the cam-guide and its connected parts.

In the machine here illustrated as embodying in its aggregate structure the specific improvements to which this patent relates, it will be seen that there is a main carrying or supporting frame, a supplemental frame connected therewith by a hinge-connection, so as to be vertically adjustable relatively thereto, a finger-beam attached to the rear of such supplemental frame, and projecting laterally from the path of the main wheels and of the team; a sweep-rake, located on the stubble side of the platform, and pivoted so as to move in a curved path, and a grain-platform attached directly to the finger-beam, and having its inner or grain side curved around toward the rear of the main frame.

The carrying-frame is composed of two pieces, D D′, and a strengthening cross-piece near their forward end, and it is supported at its forward end by attachment to the boxes C C′, in which the axle of the driving-wheels B B′ revolves, and at its rear end by the caster-wheel, F, which turns freely on its spindle E, the machine being drawn forward by the pole O, which connects with the main frame by the hounds N N pivoted to the boxes C C′.

It will be seen that by this construction the relative position of the carrying-frame and the surface of the ground will be substantially maintained as the machine moves forward, whatever the inequalities of the ground may be. The driver's seat K is mounted upon this carrying-frame in a convenient position.

The finger-beam H projects laterally at the side of the carrying-frame and the path of the driving-wheels, so that it occupies the position relatively to them of the floating finger-beam of side-cut mowing-machines. Behind the finger-beam, and suitably connected therewith, is the grain-platform P, and a rake, V, is arranged to sweep over this platform, for the purpose of removing the grain therefrom.

The rake-head is connected with a radial arm, $U^2$, which is pivoted at *u* to an upright rake-shaft, T, which turns freely in its bearings on the carrying-frame, so that the rake is caused thereby to move in a circular path over the platform. The rake-arm $U^2$, by which the rake is carried, is supported and controlled in its movements by the cam-guide S X, this cam-guide being so arranged in relation to the rake and platform as to cause the former to rise and fall correspondingly with the vertical movements of the latter, and being so constructed that the teeth of the rake will move sufficiently near to the surface of the platform, when the rake is passing from front to rear, to engage with the cut grain, but will be lifted up and carried over the grain when moving in the opposite direction. To produce this last effect the raised part X of the cam-guide is provided with a cam-ledge or upper track, *x*.

As the rake moves rearward over the platform the arm $U^2$ is supported upon the lower track or plate of the cam-guide, and is prevented from rising by means of the friction-roll $x^2$, which is borne upon a standard attached to the rake-arm, and which would strike against the under side of this cam-ledge or upper track if the rake-arm should begin to rise.

When the rake has passed out to the end of the platform where it is to deliver the gavel the rake-arm runs up the incline stationed on the rear of the lower track of the cam-guide, and the friction-roll $x^2$ having passed out from under the lower end of the upper track mounts such upper track on the return movement of the rake, and thus holds the rake above the platform until the roll reaches the forward end of the track, when the rake is permitted to descend upon the cut grain.

A downward bend at the forward end of the upper track permits the rake-head to pass under the reel-ribs when the rake is operated in connection with reel-ribs revolving on a horizontal axis. By placing the two tracks which form the main part of this cam-guide at the stubble side of the machine, between the rake-head and the upright shaft on which the rake turns, it will be entirely out of the way of the falling grain.

Two different modes of operating the rake are shown in the drawings. One is by means of the radial handle U′. The other is by means of the lever W and connecting-rod *w*, the lever W being within easy reach of the driver, so that he can operate the rake from the driver's seat.

Reel-supports R R′ are provided for holding the shaft of an ordinary gathering-reel. These supports are pivoted at their lower ends, and provided with slots and set-screws, so that they can be adjusted forward and backward, as occasion may require.

In order that the finger-beam, the reel-supports, and the grain-platform may all be raised and lowered simultaneously relatively to the ground and to the carrying-frame, as required for reaping, the finger-beam is connected with the carrying-frame by a hinge-connection. The hinge-connection in the machine shown in the drawings is formed at the points where the upper frame is pivoted to the boxes C C′. As the lower frame, which consists of the bars G G′ and the diagonal braces I I′, is attached at its upper end to these same boxes, and the finger-beam is attached to the lower end of this lower frame, this construction permits the finger-beam to be adjusted vertically relatively to the carrying-frame, as described. The inner reel-support, as shown in the drawings, is connected with the finger-beam through the intervention of the bar G′, and the outer reel-support through the intervention of a post secured to the divider end of the finger-beam. The grain-platform is secured to the finger-beam by means of hinges *p*, and thus, whenever the finger-beam is raised or lowered relatively to the upper carrying-frame, through the hinge-connection which unites the two, the reel-supports and the platform, being attached to, or connected with, the finger-beam, are raised or lowered to the same extent.

The relative adjustment of the rake and the platform is maintained under all the varying elevations of the latter by means of the cam-guide S X in the following manner: The cam-guide, instead of being made fast to the carrying-frame, is pivoted to one of the bars thereof by means of the pin or rod *s*, which rests in the boxes $s^1$ $s^2$. The inner end of the guide is provided with a fork, which embraces the rake-standard T, between the two fixed collars *t*, and this standard is free to move up and down in its bearings with the vibrations of the fork. As the rake-arm is pivoted horizontally at *u* to the standard T, which is free to turn upon its axis, and as the rake-arm is further supported upon the upper face of the cam-guide, it follows that whenever the cam-guide is rocked upon the pin or shaft *s* the vertical position of the outer end of the rake-arm, and thus also the vertical position of the rake-head, will be correspondingly changed. The cam-guide is caused to rock automatically upon its shaft by means of the lever Y pivoted to the bar D′ of the carrying-frame and the slotted stud $y^2$ upon the under side of the cam-guide. A horizontal flange, $y^1$, upon the lever *y* takes loosely into the slot in the stud $y^2$, while the forward end of the lever *y* is connected with the lower or adjustable frame of the machine by means of a pivoted rod or link. Thus, whenever the finger-beam, to which the platform is attached, is raised or lowered, the cam-guide is automatically rocked upon its shaft, and the elevation of the rake, which is controlled by the cam-guide, is changed simultaneously and to a corresponding extent.

In order to maintain the parallelism of the rake when it is raised and lowered, the rake-head is connected by a pivot with the rake-arm $U^2$, and is provided with an upright arm, *v*, which is connected by a radius-bar, T′, and pivots, with the upper end of the rake-shaft T. As the radius-bar is of the same length as the rake-arm from its pivot to the pivot of the rake-head, and as the upright arm *v* is of the same length as the length of the rake-shaft between the pivot of the rake-arm and the pivot of the radius-bar, the rake-head is caused to maintain its parallelism with the platform when sweeping over the latter, notwithstanding it is raised or lowered simultaneously with the raising and lowering of the finger-beam.

In order that the finger-beam, the grain-platform, and the connected parts may be suspended from the carrying-frame, a suspension device, *h*, is provided, which is connected at its lower end with the finger beam, and its upper end with the carrying-frame; and in order that the same device, which is so attached to the finger-beam as to constitute a yielding or flexible connection, may be used to raise and lower the finger-beam and the parts connected therewith, its upper end is connected with the carrying-frame through the intervention of a lifting-lever, J. This lever is pivoted at its rear end to the carrying-frame, while its front end passes forward within reach of the driver on the seat *k*, so that he is enabled from his seat to raise and lower the finger-beam and the platform, and the other parts connected therewith, at pleasure.

The finger-beam and connected members may be temporarily secured at any particular elevation to which they may be raised by means of a standard arranged at the side of the driver's seat, and provided with a series of holes, for the insertion of a retaining-pin under the lifting-lever, the front end of which traverses alongside the standard. The effective length of the suspension device may be varied, if required, by means of the nut screwed upon its upper end, above the eye upon the lifting-lever, through which it passes. A second nut, arranged upon this suspension device, below the lifting-lever, serves as a collar, against which the lever may be made to bear whenever the driver finds it necessary to press down upon the cutting apparatus to hold it to the ground.

The horizontality of the platform during the vertical oscillations of the finger-beam is maintained by means of a lever, L, and its connections. This lever is pivoted to the finger-beam at *l*, and is connected at its forward end *i* with one end of a second lever, M, which is pivoted to one of the diagonal braces of the lower adjustable frame, and has its other end connected with the upper carrying-frame by means of the link *d*. As the lever L reaches under and is attached to the platform, and the platform is connected with the finger-beam by hinges, this construction causes the platform to turn slightly upon its hinges as the finger-beam rises and falls, and thus its horizontality is preserved.

By securing the horizontality of the platform, which is made possible by the adjustable connection between it and the finger-beam, it follows that the rake can act with full and equal force upon all parts of the platform.

It is manifest, also, that the lever which extends rearward from the finger-beam, and under the platform, receives and sustains a large portion of the weight of the platform and the accumulated grain. Not only does it thus serve as a stay or brace to prevent injurious torsion and strain upon the finger-beam, but it also acts to prevent the drooping or sagging of the rear of the platform, which would impair the operation of the rake.

The use of a diagonal brace to prevent the sagging of the platform is specially necessary in rear-cut machines, in which the cutting apparatus and the platform are attached to the rear of the frame, since it would be impossible, without unduly increasing the weight of the structure, to extend the frame itself rearward sufficiently to furnish the requisite support.

It will be seen, upon an inspection of the drawings, that the platform is made much narrower at its delivery side than in front where it connects with the finger-beam, so that the gavel is correspondingly condensed or compacted before being discharged upon the stubble.

In the particular machine here illustrated, the rake shaft or post around which the rake oscillates, is located slightly in rear of the line of the finger-beam, and to suit this location of the rake the contraction of the platform is effected by curving both the grain and the stubble side in toward the path described by the middle tooth of the rake, which may be regarded as the central or axial line of the platform.

Both of the curved and converging sides of the platform are provided with upright walls, which keep the grain from being crowded off as it is swept rearward.

In order to enable the rake to accommodate itself to the special mode of contracting the platform here shown, the outer teeth are pivoted so as to swing laterally in the plane of the rake-head. The pivoted teeth are pressed toward each other by the converging walls of the platform, as the rake moves rearward, but return again to their normal position when the rake lifts up on its forward movement.

The principal advantage of the contracted platform is that the gavel, instead of being spread out, when delivered upon the stubble, to the full width of the swath, is contracted into much narrower compass, and thus is more convenient for binding. The gavel, moreover, is discharged without straggling, and thus lies more even than if a portion of the straw should reach the stubble in advance of the other parts of the gavel.

The contracted platform, again, permits the gavel to be delivered at the requisite distance from the standing grain with a shorter sweep of the rake than if the full width of the platform were maintained from front to rear, and the platform also is lighter, since less material is required in its construction, from which it follows that the draft of the machine is correspondingly diminished, and its durability and efficiency increased.

What is claimed as new is—

1. In combination with the sweep-rake of a harvester, adapted to move over the platform in a curved path, a grain-platform located immediately behind the cutting apparatus, and constructed to operate in connection with the rake to condense or compact the gavel prior to its delivery upon the stubble.

2. In combination with the sweep-rake of a harvester, adapted to move over the platform in a curved path, a grain-platform contracted in width toward its delivery side, for the purpose of condensing the gavel.

3. In combination with a grain-platform, having converging sides, a sweep-rake with teeth pivoted thereto, so as to vibrate in the vertical plane of the rake-head.

4. In combination with the rake, in a rear-cut harvester, a brace extending under the grain-platform, substantially as set forth, so as to support a part of the weight of the platform, and sustain it in proper position for the action of the rake.

5. In combination with the rake of a harvester, a grain-platform flexibly attached to the finger-beam, substantially as and for the purpose set forth.

JOHN P. MANNY.

Witnesses:

SAML. A. DUNCAN,

THOMAS C. CONNOLLY.